May 12, 1964   AKIO YANAGI ETAL   3,132,575
CAMERA

Filed Aug. 31, 1960   5 Sheets-Sheet 1

INVENTOR

BY

INVENTOR

BY

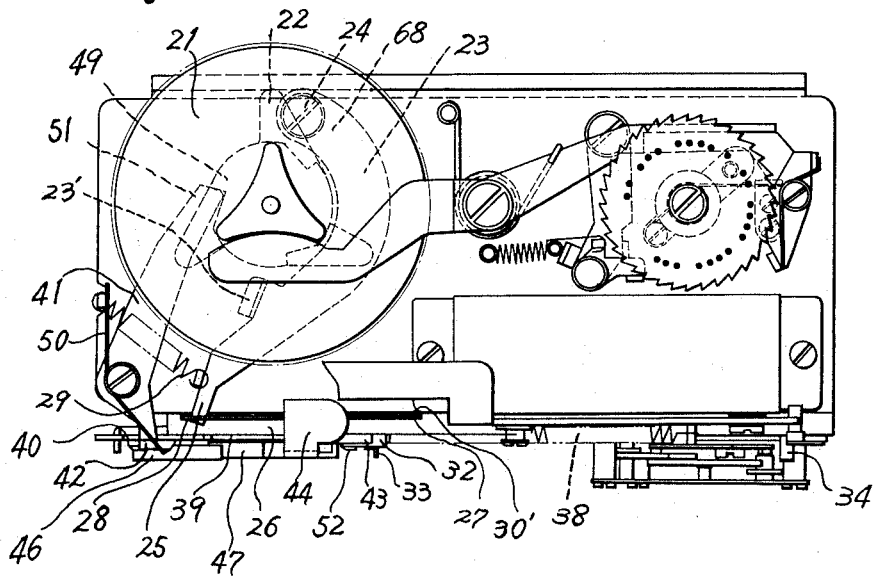
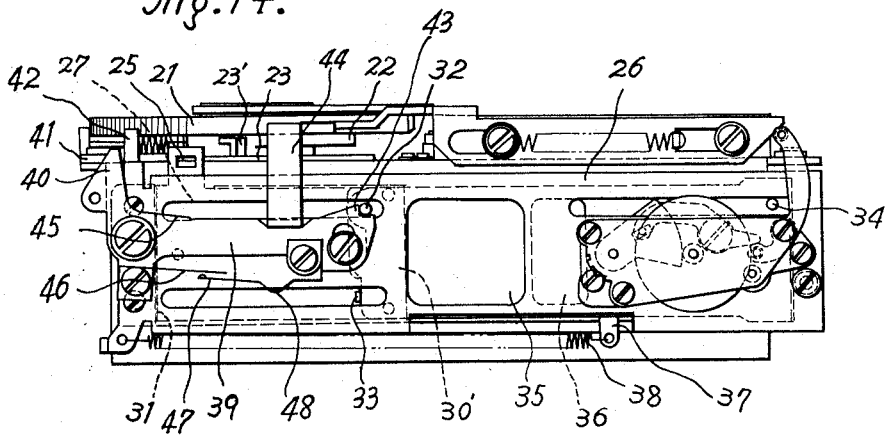

INVENTOR

BY

3,132,575
CAMERA
Akio Yanagi, Sagamihara, Eiichi Furukawa, Tokyo, and Kaichi Ikeda, Nishinomiya, Japan, assignors to Minolta Camera Kabushiki Kaisha, a corporation of Japan
Filed Aug. 31, 1960, Ser. No. 53,296
Claims priority, application Japan Sept. 2, 1959
4 Claims. (Cl. 95—64)

The present invention relates to a camera of a small over-all size and a simple construction, which is capable of accommodating respectively all apparatus and means such as an automatic adjusting means of diaphragms, shutter device, film-counter and film-moving means.

In the camera according to this invention, a finder is provided, penetrating through a camera casing, and there is provided an automatic diaphragm device of a simpler construction and a higher impact strength as compared with those of usual electric exposure meters, whereby the contact of a press-attaching plate with films is released and then a film-counter is actuated and films are reeled. Since the shutter button is so actuated that the camera is grasped vertically, no vibrations occur thus enabling the adjustment of shutter speed due to the film sensitiveness, and in addition, synchronizing means are provided. In the automatic diaphragm device in the present camera having aforementioned construction, a movable coil driven by a photoelectric cell in the meter portion of an electric exposure meter is arranged directly on a revolving disk having shutter orifices, in a remarkably distinguished manner, and a permanent magnet is provided in any suitable vacant space, the bearing for said shutter plate being provided at the necessary portion of the magnetic conductor serving also as the bearing of the shutter plate. In this case, since movable coils and magnetic conductors are provided over a relatively wide area, the revolving force due to the photoelectric cell is balanced quickly with the counter-acting force of return spring to stand still, thereby no rocking is caused to occur in the subsequent camera manipulation, which favours a shock-resistance construction of the camera.

Further, in the present camera, the film-press-attaching plate, film-counter and shutter are connected respectively with the film-reeling disc by levers, and the focusing of the lens can be done from an appropriate point on the casing in accordance with a remote controlling method.

Thus, as there are freedom of selecting places of arranging all devices in this camera, the camera can be made compact and of a small size as a whole.

Now, explanation will be given on the principal part of the camera as picked up in the following:

To begin with, in the automatic diaphragm device for the present camera, a driving coil connected with a photoelectric cell is arranged symmetrically to the circumference, and a balancer corresponding thereto is arranged in a plane in an edge portion of disks for driving iris or shutter blades, and the disks for driving said shutter blades are held pivotally and rotatably by return springs in several sets of magnetic fields formed correspondingly to said driving coils. In this case, in said several sets of magnetic fields are arranged several magnetic bodies with required space left therebetween, and yokes are provided in parallel to said magnetic bodies with predetermined apertures made of magnetic conductors, preferably arranged as closely-packed magnetic fields perpendicular to the plane arrangement of said magnetic bodies.

The object of said automatic diaphragm device of aforementioned construction is to provide an automatic diaphragm device having a small size and an easy construction, without necessitating a meter form, which is so-called a general conception, wherein disks for moving shutters are actuated by revolving force against return springs which is generated by imparting driving coils mounted on said disks correspondingly to each of several magnetic fields the electromotive force of a photoelectric cell due to the light received, in order to place said disks in an active condition corresponding to the light received by the cell thereby obtaining an automatic shutter of a stable equilibrium showing no vibration.

The present camera is provided with a shutter mechanism positioned in front of photographing lens and designed to charge a strip screen having slits in interconnection with reeling of film as in a focal plane shutter, and is so constructed as to fit a small type camera, in such a manner that the strip screen on the side of camera, which is perpendicular to the surface of a rocking reciprocation caused by a cam, a reeling plate cam is pushed to a predetermined position against a return spring by a charging lever making said rocking reciprocation, until the charging has been completed to stop, and simultaneously only rocking lever returns to the starting position with the window opened and the cover closed.

Further, the film counter of the present camera is particularly advantageous to a small type camera which is remarkably restricted in the arrangement of the film reeling member and film counter, that is, the distance, space and height thereof.

Furthermore, in the pressure-attaching device of the present camera, a film is pressed onto a photographing frame to prevent the curling of film and retain a good plainness for obtaining sharp images on the film. When the pressure is increased, it is apparent that scratches are liable to occur on reeling up and back of films, though the plainness may be improved. The present device may be provided with only one part interlocking with the reeling mechanism to ensure a strong press-attaching during photographing, while the pressure is removed to enable a free advancing of films during reeling of films.

One embodiment of the present invention and the principal parts of the camera according to this invention will now be described in further detail in reference to the accompanying drawings, in which:

FIG. 13 is a plan of the shutter device at the camera according to this invention shown in FIG. 1;

FIG. 14 is a side view of the shutter after charging has been completed;

Figure 1:
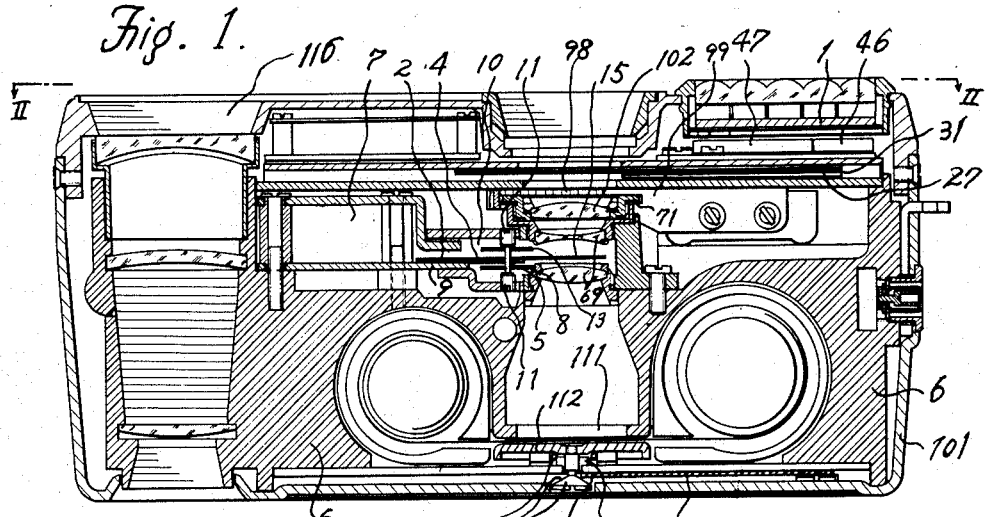
FIG. 1 is a sectional plan of the camera according to this invention.

The following description is given by way of example, but never for the purpose of limiting the invention, and of course it is possible to provide suitable modifications without departing from the spirit of the invention as defined in the claims described later. In the description, similar symbols are used for similar parts.

FIGS. 1 to 5 represent different views of the camera according to this invention respectively viewed in each different direction. Said camera is provided with a finder 116, penetrating through the casing 6, as well as an automatic diaphragm device which is simpler than usual electric exposure meter; and the release of attachment of the film press-attaching disk 112, the operation of film-counter and the reeling of films are performed by operating the film reeling plate 21; and the shutter button 44 are so operated as to grasp the present camera between them vertically thereby the speed of shutter being controlled in accordance with the sensitivity of films used; and the present camera is also equipped with a synchronizing device.

In the automatic diaphragm device of the present camera an above-mentioned construction, as will later be described in detail in connection with FIGS. 6 to 12, the movable coil 2 in the meter portion of electric exposure meter, which is driven by a photoelectric cell 1, is directly provided on a diaphragm disk comprising a thin plate of electric non-conductor and having an orifice and a comma-shaped orifice, contrary to usual ones. Therefore, no eddy current occurs on the thin plate; moreover, since said movable coil is provided over a wide area, the rotary momentum is larger and no rocking occurs. Namely permanent magnet 7 is placed in a suitable space; said bearing for said diaphragm disk is provided in a necessary portion of magnetic conductor for a combined purpose with bearings 11 and 12 of diaphragm disk 4; and since the movable coil 2 and a magnetic conductor are provided over a wide area, the rotary force of said movable coil due to photoelectric cell 1 is quickly balanced with a spring force of return spring 13 and stop. Thereafter no rocking takes place and a remarkable resistance to shock appears and accordingly this construction is advantageous and can be utilized in all types of camera.

Figure 2:
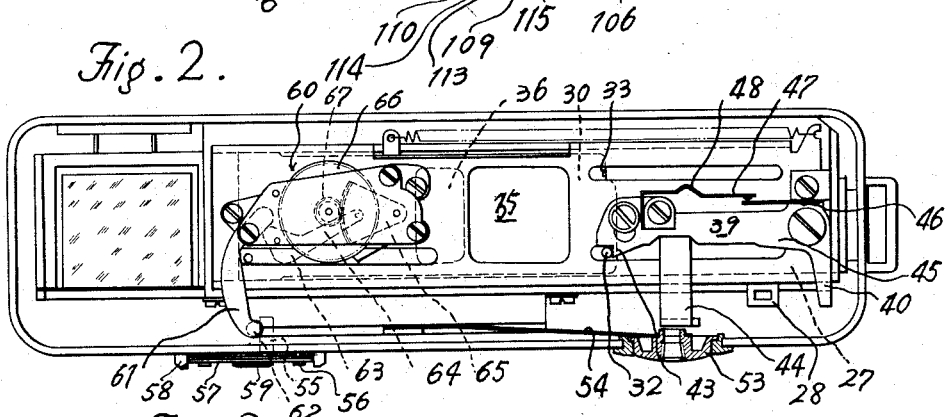
FIG. 2 is a view of the present camera seen in the direction of arrows from line II—II in FIG. 1, with the cover being detached.
Figure 3:
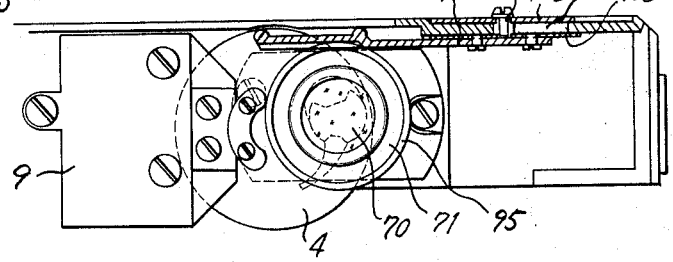
FIG. 3 is a similar view with FIG. 2 showing lenses and an exposure meter, with the front shutter being removed.
Figure 4:
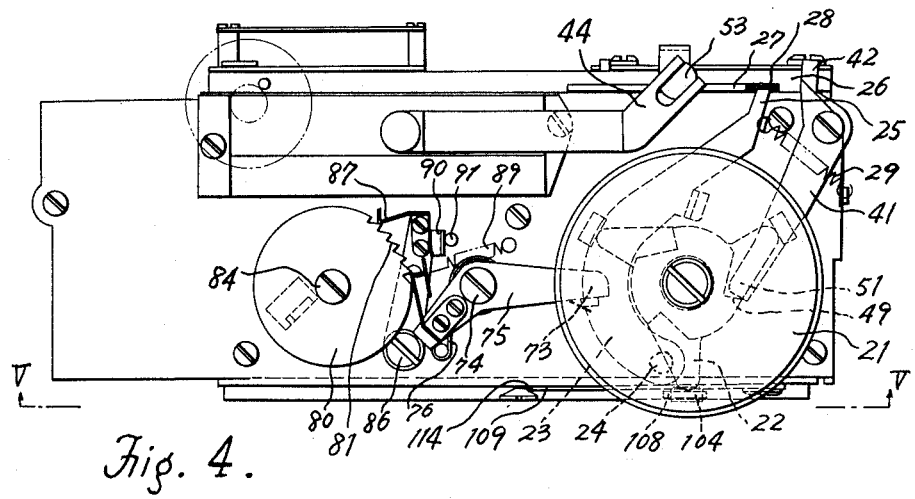
FIG. 4 is a plan of the camea as shown in FIG. 1, shown with the cover being removed.
Figure 5:
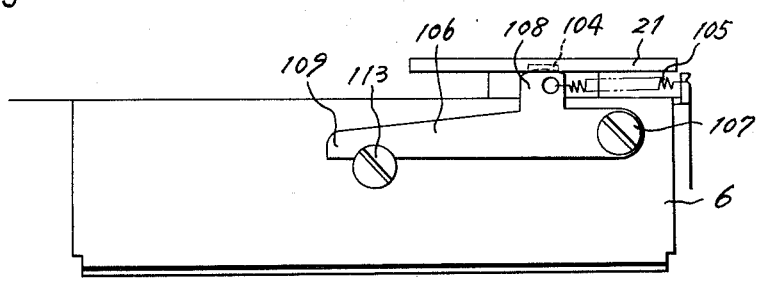
FIG. 5 is a view of the camera seen in the direction of arrows from line V—V in FIG. 4.

The reeling of film in the said camera is performed quantitatively, as shown in FIGS. 2 and 4, in such a manner that a clearance for passage of films is first formed by making the film press-attaching disk 112 tremble by the operation of said film reeling disk through respective levers 23, 39 and 41 and through said clearance are reeled up films quantitatively and stopped automatically, and one unit length of film is fed by the film counter and the charging is conducted by shutter plate 30. After an exposure has been performed through a slit 36, the said shutter plate is brought to come in contact with an inclined surface 45 of shutter release lever 39 to absorb its kinetic energy for avoiding rebounding, instead of striking strongly at stopper 52 and stopping abruptly, and simultaneously the shutter disk is released with the absorbed energy of the film reeling operation to be prepared for the next reeling of films.

On the other hand, the film-pressure-attaching disk 112 film-counting disk 30 are connected with film-reeling disk 21 respectively through corresponding levers, and the focussing of lens can be done by a remote manipulation, and from any suitable places on the camera casing 101. Thus, in the present camera, since the location of each respective devices can be selected freely, the overall dimensions of the camera can be made small.

In the next place, FIGS. 6 to 12 represent the automatic diaphragm device of the camera according to this invention as illustrated from FIGS. 1 to 5. In the drawing, 1 is a photoelectric cell, and a coil 2 for driving connected in series to said cell is provided asymmetrically to the periphery of diaphragm disk 4 as adhered directly to the disk; in order to balance said arrangement by the particular provision of coil, a balancer 3 is provided planely on the peripheral portion of diaphragm disk 4; and it is designed that when electric current is passed through coil 2, said disk is imparted a rotary force corresponding to the magnetic field intersecting with the disk at right angles.

Figure 11:
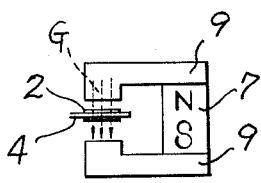
FIG. 11 is a sectional view of the coil portion shown in FIG. 10.
Figure 12:
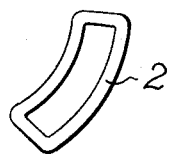
FIG. 12 represents coils.

A branch spindle 5 is secured to the disk 4 at the center thereof; permanent magnet 7 is provided opposite the driving coil 2 and suitably spaced to the coil 2, in machine body 6 of camera; furthermore, spaced in a predetermined distance from said permanent magnet 7, yokes 9, 9 of magnetic conductive material are secured in parallel to a part of machine body 6, to constitute a clearance 10, or alternatively, in cases of using upright magnets as in FIG. 11, the upper and lower yokes 9, 9 are projected, the branch spindle 5 being rotatably held by bearings 11, 12 at the middle portion of said clearance 10. Moreover, the diaphragm disk 4 is provided with return springs 13 and 8 moving in the reverse direction to that of the rotation of driving coil 2 in a closely packed magnetic fields G formed between permanent magnets 7 and yokes 9. In this case, the current flowing in a circuit from the photocell 1 enters driving coil 2 through return spring 13 and flows through return spring 8.

Figure 6:
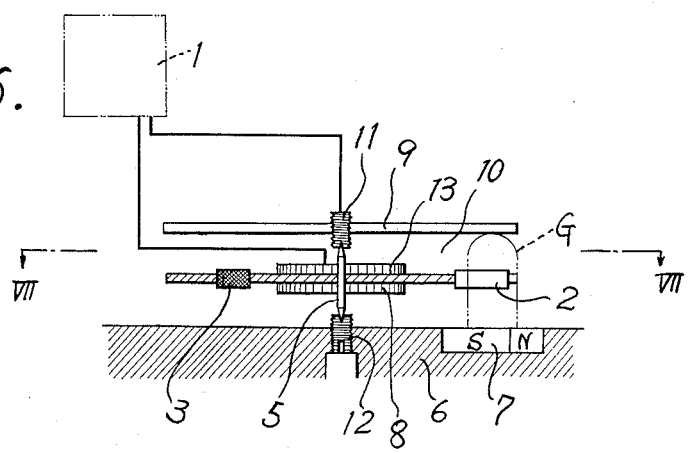
FIG. 6 is a longitudinal section of the principal parts of the automatic diaphragm in the camera according to the present invention as shown in FIG. 1.
Figure 7:
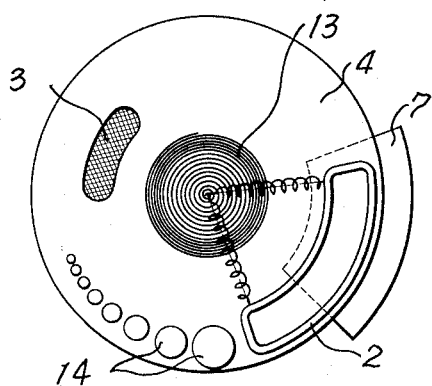
FIG. 7 is a sectional plan taken along line VII—VII in FIG. 6.

In the embodiment shown in FIGS. 6 and 7, said diaphragm disk 4 possesses several orifices 14, 14' . . . of different diameters varying stepwise from one to another directly near the outer periphery in the radial direction, whereby said orifices are so arranged as to vary the diaphragm value by changing orifices 14, 14' . . . , of different diameters by revolving said diaphragm disk correspondingly to an optical system such as those necessary to control the shutter value.

Figure 8:
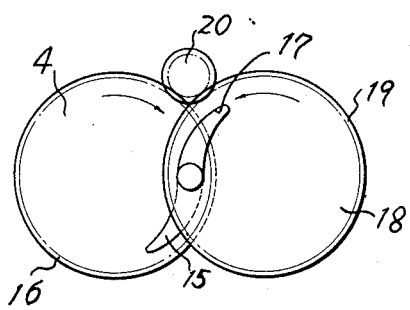
FIGS. 8 and 9 represent another embodiment of the present invention other than that shown in FIG. 7.
Figure 9:
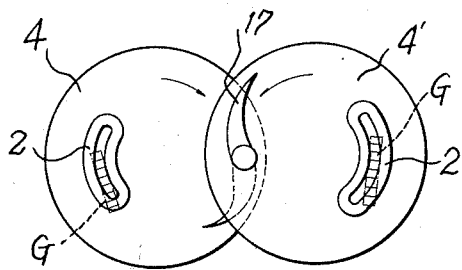
Figure 10:
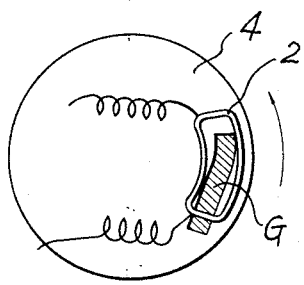
FIG. 10 represents the construction of coils in the automatic diaphragm device shown in FIG. 6.

FIG. 8 represents a case wherein a comma-shaped orifice 15, 17 is formed in each of the diaphragm-disks 4 and 18 respectively, each of the outer periphery of which is threaded respectively at 16 and 19, said orifices 15 and 17 are symmetrical with each other, which are intersected with each other following the rotation of disks 4 and 18 engaging with a pinion 20, thereby the diaphragm value being varied continuously. On the other hand, two sets of diaphragm disks 4 and 18 are provided with a common light receiving plate as electrical source and with comma-shaped orifices 15, 17 respectively, and both orifices are intersected to provide a definite diaphragm value automatically. Such an automatic diaphragm device is as illustrated in FIG. 9. Both disks 4 and 4' are provided respectively with driving coils 2, 2' corresponding to said permanent magnet 7 as well as yokes 9. Said diaphragm disks have all meter characteristics.

When an electric current is passed through driving coil 2 due to the electromotive force generated corresponding to the light received by the cell 1, the driving coil 2 will generate magnetic action corresponding to the closely-packed magnetic fields and the diaphragm disk 4 revolves in the arrow direction in FIG. 7, and balanced with the spring force of return springs 13 and 8 and stop. Thus, in the cases of FIG. 6 and FIG. 7, an orifice 14 of required bore is selectively chosen corresponding to the light received by photoelectric cell 1, and in the case of FIGS. 8 and 9, the diaphragm of a bore corresponding to the light received by photoelectric cell 1 can be controlled by orifices 15 and 17 of a curved hole in the necessary portion.

In the above-mentioned reaction, as the driving coils 2 are provided asymmetrically to the periphery of diaphragm disk 4, when the electromotive force generated in photoelectric cell 1 is imparted to said driving coil, said diaphragm disk 4 is revolved within a definite range of angle by the magnetic action generated corresponding to the closely packed magnetic fields G and simultaneously said driving coil is balanced with return springs 13 and 8 acting on diaphragm disk 4 and stop said disk by balancing.

Thus, in the present automatic diaphragm device, the diaphragm disk 4 is rotated by generating a magnetic relation between driving coil 2 and closely-packed magnetic fields, to select an orifice of a desired value in a quick responding velocity and stop definitely and has a good resistance to chock. Alternatively, an extremely small type, strong and smoothly operable device can be provided by embedding permanent magnet 7 and yokes 9 in a portion of machine body 6. In this case, since the diaphragm disk per se acts a role of a movable coil type meter, it is not needed to provide both the meter and diaphragm disk and have their cooperation, as in an interlocking eye.

Namely, as in FIG. 4, numberless orifices and provided in one sheet of diaphragm disk in discontinuous steps, or as in FIG. 8, one of the two diaphragm disks having an orifice of a curved hole is chosen as the driving side having the other to follow same through an intermediate gear, the former has a characteristic of a meter and the latter has no meter characteristic and follows only the former and determine the opening of exposure with intersecting orifices. Moreover, in the present embodiment, an iris may be formed by combining several diaphragm disks.

Moreover, as shown in FIG. 9, two diaphragm disks are attached respectively with a coil, each of which is given meter characteristics by placing same opposite a magnet, and the exposure orifice is determined by intersecting orifices of a curved hole; and since a generally formed, movable coil type meter is not required, and consequently the improvement of shock resistance and reduction of damages due to the decrease of parts can be anticipated. The well-known coil frames are of no use and the diaphragm mechanism as a whole of the movable portion can be formed in a small and light, because the stationary part is embedded in the machine body and coils are all adhered directly to the diaphragm disk. When movable coil type meters are used for the diaphragm mechanism, value, and the important factor to determine is the electromagnetic braking, which is generally due to the induced electromotive force generated in coils and coil frames, while, in general meters, there is a limitation in selecting material for a magnet which generates a large amount of magnetic flux, and there is a limitation by the volume for accommodating coils, coil-frames and magnets when they are used for the diaphragm, an insufficient braking is resulted due to a remarkable increase of the moment of inertia of movable portion together with related mechanisms. Unstability of diaphragm value is liable to be resulted. In the present device, since the coil is adhered to the surface of the disk directly, particularly a coil frame is inutile, there is, however, no fear of becoming unstable. On the other hand, since magnets can be embedded in a camera body, there is no limit in the size. The use of aluminum material in the diaphragm disk enligthens the inertia of the movable portion and at the same time as the diaphragm disk per se has by far a larger area as compared with the coil frame for general use, the electromagnetic braking force due to those factors is incomparably large.

Namely, the present apparatus can easily use the diaphragm disk movement having a higher electromagnetic braking as compared with usual meters, as a critical braking, and also it can be formed characteristically in an extremely small, strong and smooth operative construction most suitable for a bellows type camera. As a result, since a larger and strong magnet can be used and consequently a larger rotating angle can be used as compared with general meters, the selecting range of photographing diaphragm can be increased simultaneously the stability to allowance in deviations of diaphragm can also be increased and the accuracy of diaphragm control can be obtained.

Furthermore, as in the revolution of scale no vibration of indicator needle occurs, the exposure scale can be made extraordinarily easy to read.

FIGS. 13 and 14 are a plan and a side view respectively of the camera, when the shutter charging has been completed, according to this invention as shown in FIGS. 1 to 5. In the drawings, a part of the periphery is protruded in arc form from a side of camera casing 6 to form a hold for revolution; a charging cam 22 is provided on a film reeling plate 21 pivoted on the upper face of said casing body and other charging lever 23 engaging with said charging cam 22 is pivoted to spindle 24 with its rear portion 68, the head portion 25 being guided on the vertical plane by guide frame plate 26 and engaged with protruded tongue piece 28 of a lateral reciprocating shutter diaphragm lifting and window cover lid 27 and energized with spring 29 clockwise. The sheet shutter film 30 is retained by guide frame sheet 26, in such a manner that said film 30 may be reciprocated transversely, and which is slidably lapped with said cover lid 27 and the left side end 30' comes near the folded edge 31 of said cover. Said film 30 has an actuating pin 32, a projection 13 for braking synchronous circuit and a governor which operates a pin 34 projecting each guide groove which is not illustrated of said guide frame plate 26, and has a slit 36 having a width about a half that of photographing window 35 of guide frame plate 26, and is energized toward the left by hanging the return spring 38 on the projectingly provided tongue 37. The releasing lever 39 is pivotally secured to a part of L-shaped lever and the rear portion 40 comes near the head portion 42 of film-counting lever 41, said head portion is cut to form a hook portion 43 to stop an actuating pin of shutter film 30, and a branch rod is extended to the upper face of casing 6 to constitute shutter button 44 and simultaneously an inclined surface 45 near the return point of actuating pin 32. Moreover, on the side of body 101 is secured a resilient, movable synchronous contact point 47 opposite a stationary contact point 46, said contact point 47 being arranged to bring the expanded portion 48 to stand near the locus of projection 33 for braking circuit.

The film-counting cam 49 is provided as overlapped with charging cam 22, said cam 49 being engaged under contact with the rear portion 51 of counting lever 41 which is energized clockwise by spring 50, the head portion 44 being placed near the rear portion 40 of release bar 39 as referred to above.

In reference to FIG. 14, the operation will be explained from the very beginning of shutter charging. First, when shutter button 44 is pushed, the release lever 39 revolves clockwise, until it arrives at stopper 52 by means of a long hole and stop screw, and the actuating pin 32 is detached from hook portion 43, the sheet shutter film 30 being pulled with spring 38 advancing to the left and slit 36 passing over photographing window 35 when an exposure is effected, while projection 33 strikes at expanded portion 48 to raise contact point 47 instantaneously closing the synchronous circuit; and then since actuating pin 32 strikes against an inclined surface 45 to revolve clockwise releasing lever 39 with the kinetic energy and the tractive force of spring 38, and the rear portion 40 pushes on the head portion 42 of counting lever 41 and revolves counterclockwise against spring 50, the rear portion 51 being detached from halting portion 49 of counting cam 49 releasing the reeling operation. During the sheet shutter film 30 being advanced to the left, the governor actuating pin 34 conducts, of course, the predetermined lagging.

When the reeling of film is performed by revolving film-reeling disk 21 counterclockwise, the projection 22' of charging cam 22 will strike on the engaging projection 23' of charging lever 23, after a little advance, and will revolve said lever against spring 29 counterclockwise, and the head portion 25 performing an enlarging linear movement, allowing a window-cover-lid 27 and plate shutter film 30 overlapping therewith to proceed to the right through projecting tongue piece 28 against spring 38. When the slit 36 of film 30 passes over window 35, the exposure is not effected because the cover 27 is placed on the back side. When the actuating pin 32 advances to the right and departs from inclined surface 45, the release lever 39 is liberated, and then counting lever 41 is revolved clockwise by spring 50, and on the way of the rear portion 51 entering in a recess of counting cam 49, the rear portion 40 of said release lever 39 being revolved counterclockwise by pushing the portion 40, and the hook portion 43 is raised to disturb the return movement towards the left, and simultaneously the apex of charging cam 22 passes through the max. point and drops off projection 23', when the resiliently contacting charge lever 23 returns rapidly to the original position accompanied by window-cover lid 27 through tongue piece 28 engaging with head portion 25, under action of spring 29, as in the halting recess of the counting cam 49 just enters the rear portion of counting lever 41, and thereafter the reeling of film is stopped.

Thus, in a shutter device referred to above, the charge-lever 23 pivotally holding rear portion 68 is brought to come in contact with charging cam 22 provided on film-reeling disk 21, whereby the charging and exposure are performed by reciprocating the sheet-shutter-film 30 overlapping with the lid 27 on the vertical plane engaging with a hole of tongue 28 in the head portion 25 performing an enlarged movement; accordingly, these devices are provided on the upper surface and side faces of camera casing 6 as shown in FIGS. 1, 2 and 4; accordingly, no vast space is needed, and actuating pin 32 is caused to stroke on inclined surface 45 of releasing lever 39 to absorb excess energy and to utilize same for preventing the rebounding of shutter film 30 firmly by applying the compressive force due to spring 38 of actuating pin 32 along said inclined surface 45, and moreover, the reeling of films is released by applying it also to the counting lever 41; and on the other hand, the said pin 32 is hooked after charging, and also said hooking is released by similar way as shutter button 44; or it is also related to a synchronous contact point 47. Thus, the shutter device as referred to above can be remarkably simplified in its construction by the provision of release levers 39 and advantageously used for small type cameras.

The shutter button 53 neighbouring shutter button 44 in FIG. 2 is held elastically by spring 54; and in order to control the shutter velocity due to film-sensitivity, the scale plate 57 having a velocity controlling pin 55 as well as grip 56 is pivotally held by spindle 59 in round frame 58, velocity pin 55 comes in contact with pin 62 of a driven lever 61 pivoted to governor 60. Said driven lever is connected with a sector gear 65 meshing with a pinion 67 integral with a large gear wheel 66 through an intermediate lever 64 having an expanded portion 63 in the vicinity of a locus of reciprocal movement of a governor actuating pin 34; since governor actuating pin 34 strikes at the expanded portion 63 when shutter film 30 runs, the large gear wheel 66 is driven through sector gear 65 and pinion 67. Namely, the amount of revolution of a large gear wheel 66 is controlled by the controlling of scale plate 57 for the controlling of shutter velocity. In place of the scale for film-sensitivity in scale plate 57, a shutter velocity scale is provided, and for the control by film-sensitivity, a device may be particularly provided for controlling the resistance of the circuit of a photoelectric cell.

Figure 15:
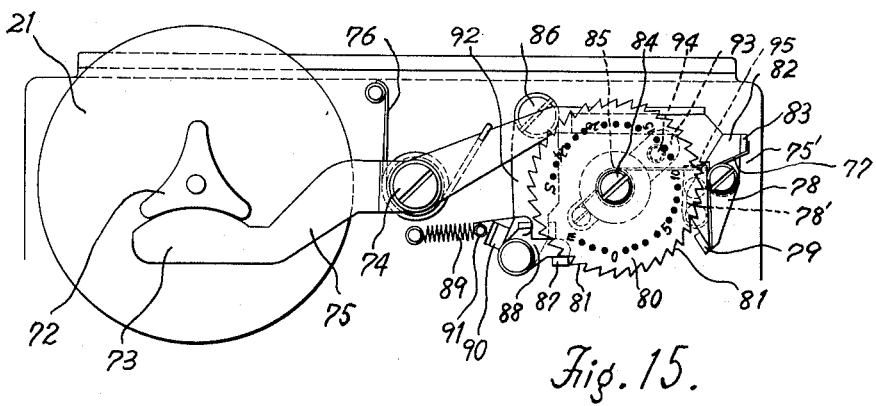
FIG. 15 is a plan of the film counter in the camera according to the present invention shown in FIG. 1.

FIG. 15 represents a plan of the film-counter in the camera according to this invention illustrated in FIGS. 1 to 5. In the drawing, a film-reeling plate 21, a part of which is projected in arc form on one side of camera body 101 has a film-counter actuating cam 72 pivotally secured to said camera body 101, as well as an expanded head portion 73 which is always brought to contact with actuating cam 72 as rocking bar 75 pivotally held by spindle 74 is energized clockwise by spring 76. At the rear portion 75' of rocking bar 75 is secured an actuating piece 78 pivotally, which is energized clockwise by spring 77. Teeth 81 formed on the periphery of film-counting disk 80 is brought in the neighborhood of a locus of rocking motion of a feed claw 79 provided on the head portion of the rocking bar 75 and is brought in contact with stopper 83 provided on the rocking bar 75. The film-counting disk 80 bears S (starting point) and E (end point) other than the wellknown numbers of films on the surface.

Said disk 80 is energized clockwise by return spring 85 provided on the central axis 84 and at the same time the rear portion of disk 80 is pivotally secured with spindle 86 to a part of teeth 81 and bifurcated lever 88 is pivotally secured, with stop claw 87 being formed on the head portion, one branch rod of which is pulled by spring 89; and a claw 87 of reverse-running-preventing rod 92 brought in contact with a stopper 91 capable of appearing and disappearing protruded from the back surface inside the camera is engaged, with an end of contacting portion 90 formed with an inclined surface thus preventing the return spring 85 from returning to zero. Cam 93 secured to the back surface of film counting disk 80 has its locus of revolution be brought in contact with expanded portion 78' of actuating piece 78, and a pin 94 is planted opposite the stopper 95 on the side of camera body and said cam is halted at the predetermined position when the returning to zero is effected. The stopper 91 is so resiliently held as to penetrate into a film magazine inside camera, and the stopper is raised against spring to use as a stopper, by closing the cover of the film magazine.

In film-counters of a construction as described before, when the film reeling disk 21 is revolved according as a normal method, the convex portion of cam 72 following said reeling disk 21 pushes the expanded head portion 73 contacting therewith outwards against spring 76. Accordingly, rocking bar 75 revolves counterclockwise, and passes over the top of cam 72 and the expanded head portion 73 enters next recess and the rocking bar 75 then revolves clockwise contrary to before. Namely, as the rocking bar 75 makes one rocking reciprocating movement, each time when the top of cam 72 is once passed by the expanded portion 73. Accordingly, the rear portion 75' also performs a similar movement, and the actuating piece 78, of which rear portion 82 is oppressed by stopper 83 in the counterclockwise revolution (advance movement), revolves for one unit tooth length accompanying feeding claw 79 which engages with saw teeth of film-counting disk 80 a little space of time after starting, when the halt claw 87 also revolves one unit teeth length against spring 89 and then engages with the next tooth to prevent the reverse revolution; and when rocking bar 75 is moved clockwise (return movement), the feed claw 79 returns across a saw-tooth 81, and at the final point of rocking movement the saw-tooth 81 and feeding claw 79 are entirely separated from each other. The unit number of films having been photographed in the predetermined number of unit length films is shown and simultaneously the cam 93 comes to a position where it strikes at expanded portion 78' of actuating piece 78, and pushes the portion 78' outwards; therefore, if film-reeling disk 21 is revolved to actuate rocking bar 75, the feeding claw 79 does not engage with the saw-tooth 81 and makes only empty running and the film-counting disk 80 remains stopping. When the lid of film-magazine is removed to take out films, stopper 41 will lose an external force to lift, and it descends down to the predetermined position under the action of a spring attached to itself. Therefore, the preventing rod 92 being pulled by spring 89 is released of its oppression and revolves clockwise, but the revolution is stopped again by striking at the head portion of descending stopper with the lower side of the inclined surface. Since upper claw 87 is retreated from saw-tooth 81 by the clockwise revolution of preventing rod 92, the film-counting disk 80 revolves clockwise to return zero-position under the action of spring 85 and pin 94 strikes on stopper 95 and stops. When films are charged and the lid is shutted, stopper 91 will be again raised and push the inclined surface aside against spring 89 to revolve the preventing rod 92 counterclockwise and halt claw 87 is caused to engage with saw-tooth 81 and simultaneously to contact with the contact portion 90 to act the role of original stopper. Even when the film-magazine is opened in the course of photographing, the film-counting disk 80 will revolve to effect the "returning to zero" operation as before.

Thus, the film-counter as referred to above effects film-taking-out operation to automatically cause the film-counting disk to return to zero. Accordingly, in the film-charging operation, the automatic starting-mark appears conveniently. Usually, since the feeding claw engages always with saw teeth under the action of a spring together with the halting claw, it is necessary to make two or three raw-teeth absent correspondingly opposite the feeding claw to effect empty feeding of corresponding number of unit length of films. Moreover, in order to nullify the number of unit length films, it is necessary to make both claws retreat, and however, as feeding claw 79 is always positioned as spaced from saw teeth 81 excepting during the operation in said principal film-counter. Accordingly, as the operation of seeking zero-point can be made by merely avoiding halting claw 87, the necessary construction is simple. Furthermore, since the cam movement of film-reeling disk 21 is transmitted to film-counting disk 80, the freedom is remarkably increased with respect to the position of arrangement for both members, by proper choice of shapes and sizes of rocking bar 75, which is remarkably advantageous, particularly in the design of a small type camera which required numerous requirements.

Figure 16:
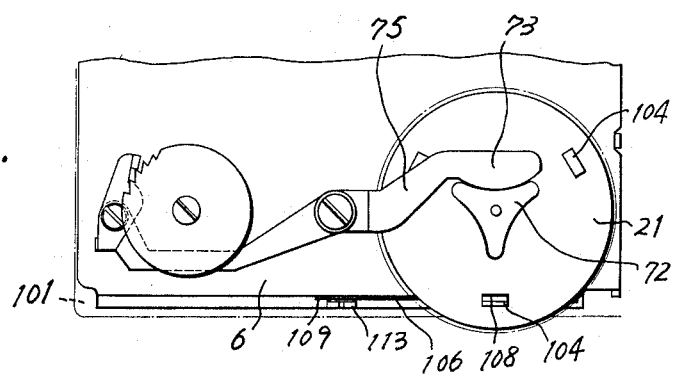
FIG. 16 is a plan of the film press-attaching device of the similar camera as shown previously.
Figures 17, 18:
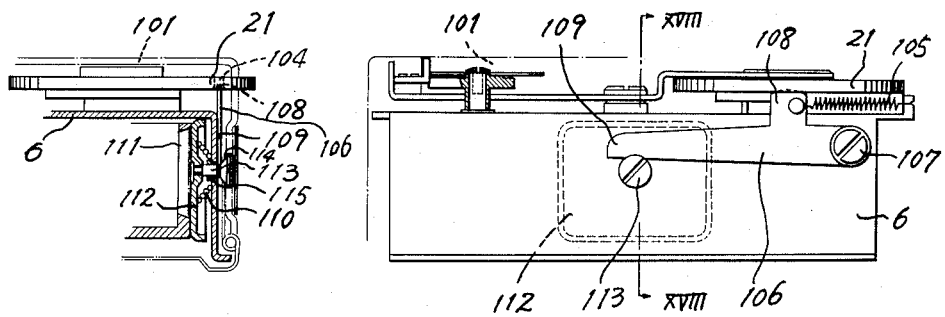
FIG. 17 is a side view of FIG. 16.
FIG. 18 is a sectional side view taken along line XVII—XVII of FIG. 17.

In the next place, FIGS. 16 to 18, film-press-attaching device according to this application as shown in FIGS. 1 to 5 is illustrated, each of the figures represents a film-press-attaching device for the camera according to this invention, i.e. the device on a photographing condition. A long hole (or a recess) 104 is provided at a position for the reeling of one unit length film in reeling disk 21 pivotally secured to casing body 6 in camera casing 101 and an actuating rod 106 resiliently held by a spring 105 clockwise on a side wall of casing 6 by means of spindle 107 pivotally, the protruded tongue piece 108 of said rod 106 being placed opposite said long hole 104 said head portion 109 being brought to come in contact with an inclined surface 114 of head portion of branch spindle 113. Said branch spindle 113 is loosely inserted in a guide cylinder 115 secured to casing 6, the rear portion inside the casing being screwed to film-press-attaching disk 112 grasping a spring 110 between the casing wall and the rear portion, the head portion having an inclined surface 114 being positioned outside the casing and is loosely inserted in the casing 101 within cover plate 116.

Now, when films are intended to reel by revolving the film-reeling disk 21 after photographing, a tongue piece 108 of actuating rod 106 inserting a long hole (or a long groove) 104 will naturally be push out of said long hole 104, because of the head portion of tongue 108 being rounded. Therefore, actuating rod 106 revolves about spindle 107 counterclockwise. As a result, the head portion 109 with an elongated distance of movement pushes on inclined surface 114 to have the branch spindle 113 with film-press-attaching disk 112 to advance to the right against spring 110. Therefore, a clearance is formed between the photographing window frame 111 and said press-attaching disk 112, the compression on films are removed and a free advancing is ensured. Accordingly, the revolving and advancing of film-reeling disk 21 can be smoothly performed without scratches. As soon as one unit length of film is reeled up, the reeling is halted by a well-known stopping mechanism and the automatic reeling stops and simultaneously the long hole 104 of film-reeling disk 21 is energized clockwise, and tongue piece 108 having been sliding on the back surface enters and the head portion 109 of actuating rod 106 retreats from the inclined surface 114. Therefore, film-press-attaching disk 112 presses the film against photographing window frame 111 under the action of spring to sectify the curling of films and obtain a favorable photographing condition such as a good plainness.

Thus the film-press-attaching device as referred to above can be operated automatically by mere provision of an extremely simple construction, such as actuating rod 106 relating to the film-reeling-disk 21, a clearance is formed by drawing the film-press-attaching disk 112 this way, while films are reeled, through said clearance being freely passed films, preventing the films from being scratched by said press-attaching disk or photographing window frames, and the curling of film is arranged to be rectified by press-attaching the film to the photographing window frame while photographing is performed, to improve the plainness for providing clear and sharp images.

Moreover, in FIG. 1, the front lens of the photographing lens 69 is focussing lens 70 for focussing by revolving and bellowing the camera, and the frame 71 is coincident with helicoid 96, pinion teeth 97 of roulette type being formed on one part thereof. The lever 99 having rack teeth 98 meshing with said pinion teeth is made of Bakelite or the like and is resiliently and lightly held. The rear portion is provided with induction pin 100 sliding transversely in long hole 102 and also with blinding sheet 103 and the focusing can be performed by operating from outside casing 101.

What we claim is:

1. In a camera, the combination comprising a camera casing, a diaphragm disk in said casing and means for automatically adjusting the diaphragm disk in response to the intensity of a light source, said means comprising a photoelectric cell mounted within said casing, a coil secured asymmetrically to said diaphragm disk adjacent a peripheral portion thereof, and being operatively connected to said photoelectric cell, a permanent magnet mounted within said casing in proximity to said coil, spring means operatively connected to said diaphragm disk for resisting rotation thereof, and variable orifice means formed in said diaphragm disk, said photoelectric cell generating an electric current which will pass through said coil in proximity to said magnet thereby moving said diaphragm disk together with said variable orifice means.

2. The combination as recited in claim 1, wherein said orifice means comprises a plurality of openings of different diameters disposed adjacent another peripheral portion of said diaphragm disk whereby an exposure opening of required diameter is automatically selected in response to the intensity of light received by said photoelectric cell.

3. In a camera, the combination comprising a camera casing, a pair of overlapping diaphragm disks rotatably mounted in said casing, a photoelectric cell in said casing, a coil secured asymmetrically to each diaphragm disk adjacent a peripherial portion thereof and being operatively connected to said photoelectric cell, a permanent magnet disposed in said casing in proximity to each coil, spring means operatively connected to each diaphragm disk for resisting rotation thereof, and variable orifice means formed in overlapping portions of said diaphragm disks, said photoelectric cell generating an electric current which will pass through each coil in proximity to said magnet thereby moving said diaphragm disks together with said variable orifice means.

4. The combination as recited in claim 3, wherein said orifice means comprises a curved opening in another peripheral portion of each diaphragm disk whereby an exposure opening is automatically selected in response to the intensity of light received by said photoelectric cell.

References Cited in the file of this patent

UNITED STATES PATENTS

| | | |
|---|---|---|
| 2,153,153 | Nelson | Apr. 4, 1939 |
| 2,163,737 | Prinsen | June 27, 1939 |
| 2,213,742 | Mihalyi | Sept. 3, 1940 |
| 2,282,659 | Kun | May 12, 1942 |
| 2,495,019 | Nadel | Jan. 17, 1950 |
| 2,646,718 | Favre | July 28, 1953 |
| 2,879,702 | Gossen | Mar. 31, 1959 |
| 2,975,686 | Gebele | Mar. 21, 1961 |